US012307909B2

(12) United States Patent
Ogden et al.

(10) Patent No.: US 12,307,909 B2
(45) Date of Patent: May 20, 2025

(54) SPEED SCHEDULE TRACKING

(71) Applicant: Rockwell Collins, Inc., Cedar Rapids, IA (US)

(72) Inventors: Collin D Ogden, Marion, IA (US); Jesse J Bliss, Cedar Rapids, IA (US); David M Eckert, Swisher, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 384 days.

(21) Appl. No.: 18/089,217

(22) Filed: Dec. 27, 2022

(65) Prior Publication Data

US 2024/0212510 A1 Jun. 27, 2024

(51) Int. Cl.

| | |
|---|---|
| ***G08G 5/00*** | (2025.01) |
| ***G08G 5/21*** | (2025.01) |
| ***G08G 5/26*** | (2025.01) |
| ***G08G 5/34*** | (2025.01) |
| ***G08G 5/80*** | (2025.01) |

(52) U.S. Cl.

CPC ................ *G08G 5/34* (2025.01); *G08G 5/21* (2025.01); *G08G 5/26* (2025.01); *G08G 5/80* (2025.01)

(58) Field of Classification Search

CPC .. G08G 5/0039; G08G 5/0013; G08G 5/0021; G08G 5/045

See application file for complete search history.

(56) References Cited

U.S. PATENT DOCUMENTS

| | | | | |
|---|---|---|---|---|
| 7,512,464 | B2 | 3/2009 | Tarleton et al. | |
| 8,738,200 | B2 | 5/2014 | Mere et al. | |
| 2011/0208376 | A1 * | 8/2011 | Mere ..................... | G01C 23/00 701/14 |
| 2013/0226373 | A1 | 8/2013 | Bollapragada et al. | |
| 2014/0257598 | A1 | 9/2014 | Bailey et al. | |

OTHER PUBLICATIONS

European Search Report received in EP Application No. 23217778, Jun. 5, 2024, 10 pages.

* cited by examiner

*Primary Examiner* — Yuen Wong

(74) *Attorney, Agent, or Firm* — Suiter Swantz IP

(57) ABSTRACT

A system and method are provided for continuously monitoring manual flight inputs and updating a flight management system with those manual inputs. The flight management system recalculates and provides predictions based on the manual inputs. The flight management system may continuously monitor certain thresholds. The flight management system utilizes the crew entered speed schedule until a threshold is exceeded. When the flight management system is reengaged, it may utilize the manually entered speeds within the speed schedule for a current phase of the flight. The flight management system may analyze the manual input and corresponding predictions to determine if they are within or conform to certain predefined criteria before using them for automated flight.

14 Claims, 4 Drawing Sheets

SPEED SCHEDULE TRACKING

BACKGROUND

Flight management systems provide a flight crew the ability to plan speed schedules that an aircraft should follow for each phase of a flight. There are many aircraft performance features that use these speed schedules to enable predictions and functions. The FMS currently determines its time and fuel predictions at the destination based on the entered FMS planned speed for each phase of flight along with other data from both the aircraft itself and the current environment in which it is operating in. However, flight crews often disengage the flight management system-controlled speed and fly manually (i.e., air traffic control instructs the crew to make a temporary speed change for traffic). The crew inputs a new manual speed, but generally do not update the speed schedule in the flight management system.

During manual flight, the flight management system will continue to make predictions based on the planned speed schedules and cannot provide accurate predictions to the flight profile based on the manual speed. Usually, deviations from the speed schedule are temporary and it would be inconvenient or cumbersome for the crew to alter the speed schedule because they expect to the originally planned speed schedule. "There are situations where the manual speed may become a prolonged deviation or will no longer be temporary and will need to be incorporated into the FMS plan.

SUMMARY

In one aspect, embodiments of the inventive concepts disclosed herein are directed to a system and method for continuously monitoring manual flight inputs and updating a flight management system with those manual inputs. The flight management system recalculates and provides predictions based on the manual inputs.

In a further aspect, the flight management system may continuously monitor certain thresholds. The flight management system utilizes the crew entered speed schedule until a threshold is exceeded.

In a further aspect, when the flight management system is reengaged, it may utilize the manually entered speeds within the speed schedule for a current phase of the flight. The flight management system may analyze the manual input and corresponding predictions to determine if they are within or conform to certain predefined criteria before using them for automated flight.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
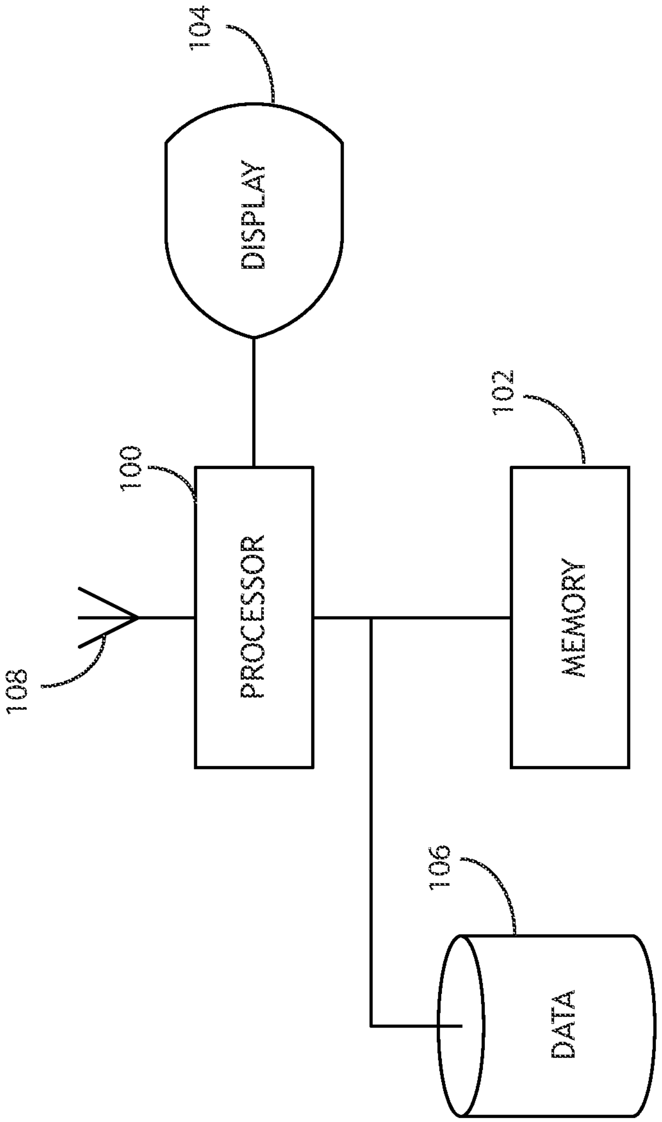
FIG. 1 shows a block diagram of a system suitable for implementing an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for continuously monitoring manual flight inputs and updating a flight management system with those manual inputs. The flight management system recalculates and provides predictions based on the manual inputs. The flight management system may continuously monitor certain thresholds. The flight management system utilizes the crew entered speed schedule until a threshold is exceeded. When the flight management system is reengaged, it may utilize the manually entered speeds within the speed schedule for a current phase of the flight. The flight management system may analyze the manual input and corresponding predictions to determine if they are within or conform to certain predefined criteria before using them for automated flight.

Referring to FIG. 1, a block diagram of a system suitable for implementing an exemplary embodiment is shown. The system includes a processor 100, a memory 102 for storing processor executable code, and a display 104 in data communication with the processor 100. The system, which may be embodied in a flight management system, may be in an automatic mode wherein the processor 100 produces predictions base on a crew supplied speed schedule, or in a manual mode wherein the processor 100 produces predictions based on an instantaneous manual speed input. Such predictions may include time, fuel, and distance predictions.

Figure 2A:
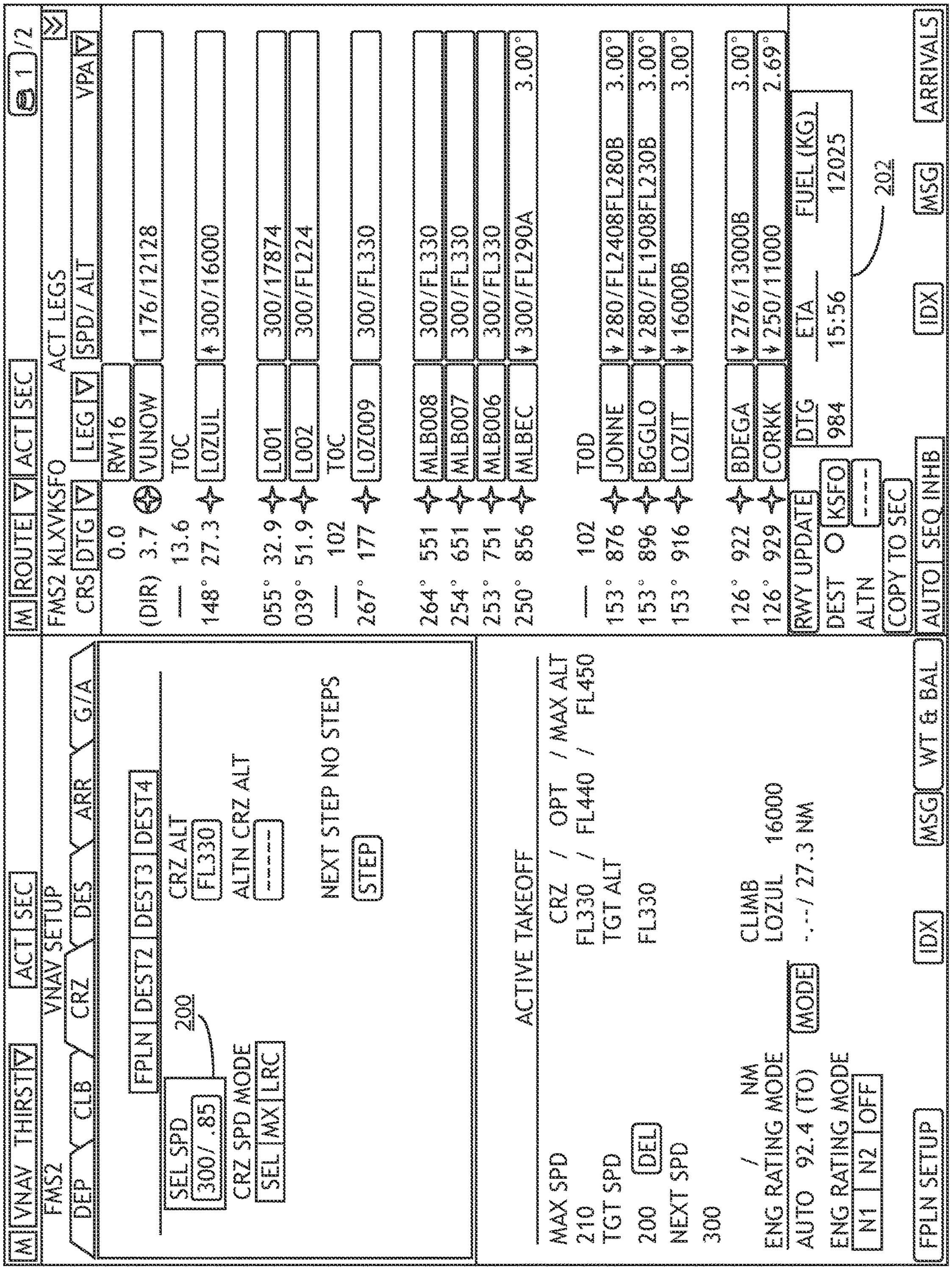
FIG. 2A shows a flight management system interface useful for implementing an exemplary embodiment.
Figure 2B:
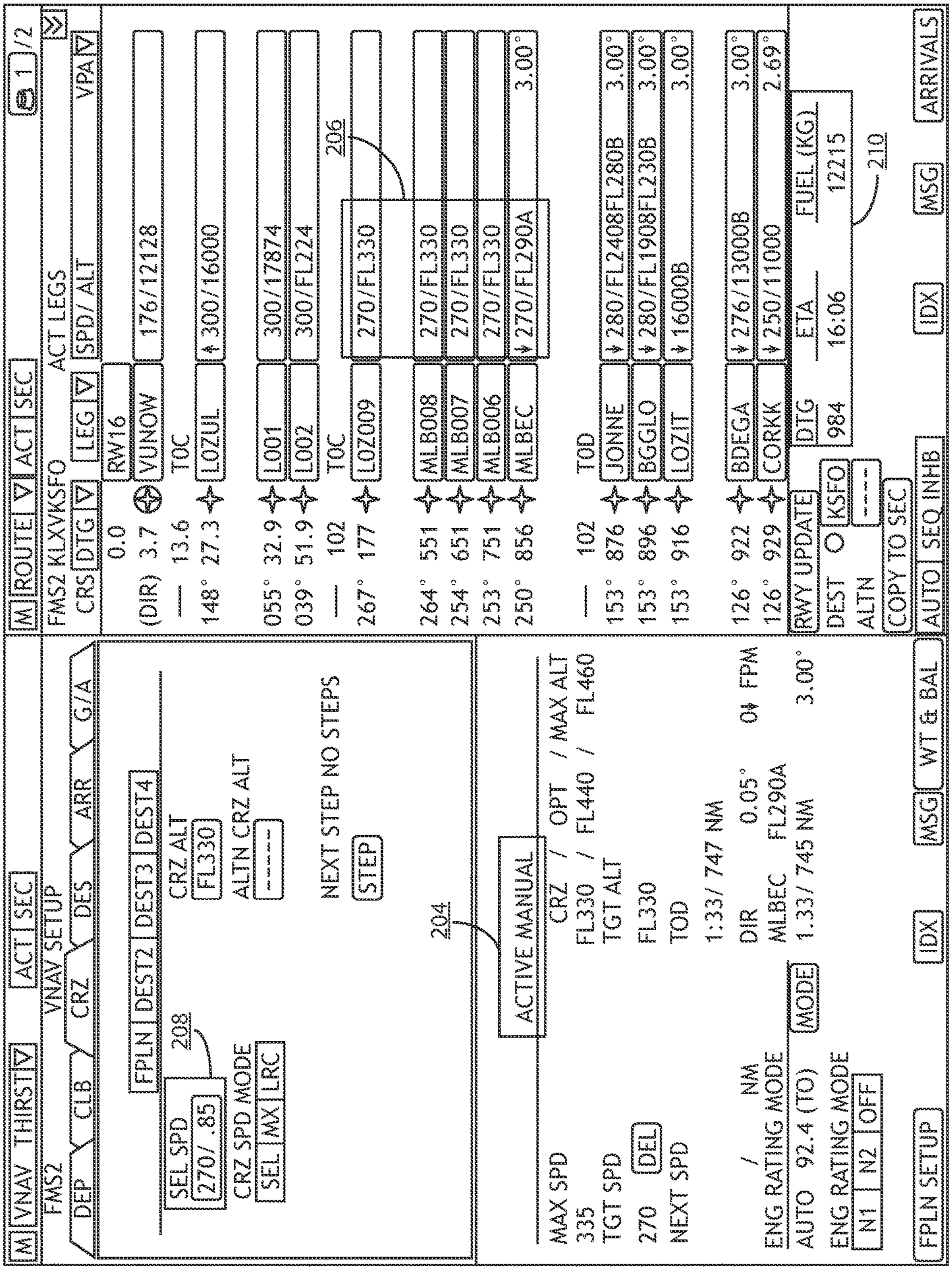
FIG. 2B shows a flight management system interface useful for implementing an exemplary embodiment.

In at least one embodiment, the processor 100 receives a crew supplied speed schedule corresponding to certain flight phases and produces and renders predictions on the display 104 (as in FIGS. 2A-2B). Existing systems, when placed in the manual mode, continue to produce predictions based on the speed schedule. A processor 100 according to an exemplary embodiment determines when the system is in a manual mode (either directly via a user interface input, crew entry of a manual speed input, signal from a separate avionics component via a data connection element 108, a deviation from the speed schedule as identified via a separate avionics component, etc.).

When the processor 100 determines that the system has entered the manual mode, the processor 100 may begin monitoring certain threshold criteria. While no threshold criteria are exceeded, the processor 100 may continue to render predictions based on the speed schedule with the expectation that the manual deviation from the speed schedule will be short lived, deviations minimal, and that it would be confusing to supply long term predictions based on short term speed changes.

When the processor 100 determines that one of the threshold criteria has been exceeded, the processor 100 may begin rendering predictions based on the manual speed instead of the speed schedule with the expectation that the manually input speed will be longer than minimal in duration, and will result in prediction deviations substantial enough to warrant crew attention. In at least one embodiment, threshold criteria may include an absolute time while in the manual mode (i.e., after ten minutes in the manual mode, the processor 100 may switch to predictions based on the manual speed input), a percentage time (i.e., after five percent of the flight phase is spend in the manual mode), or the like. Alternatively, or in addition, the threshold criteria may comprise threshold deviations; for example, the processor 100 may begin producing predictions based on the manual speed input when the system enters the manual mode, and compare predictions based on the manual speed to the predictions based on the speed schedule. When the predictions based on the manual speed deviate from the predictions based on the speed schedule by more than a threshold amount, the processor 100 may begin rendering the predictions based on the manual speed. In at least one embodiment, the threshold criteria may comprise a weighted function of several data points; for example, the processor 100 may execute a function based on the time in the manual mode and the absolute deviation between the speed schedule and manual speed such that a greater speed deviation over a short period of time triggers the same threshold criteria as a small speed deviation over a longer period of time.

In at least one embodiment, where the processor 100 produces and monitors predictions based on the manual speed even while still in the automatic mode, the processor 100 may determine if those predictions exceed some safety threshold (i.e., fuel usage or the like). The threshold criteria may comprise anticipated violations of those safety thresholds.

In at least one embodiment, the processor 100 may amend the speed schedule, or offer the crew the option to amend the speed schedule based on some threshold criteria, for example after some threshold time in the manual mode, to simplify crew operations. While in the manual mode, the processor 100 may monitor a set of criteria and offer a new soft selection, or trigger the FMS to offer a soft selection, to allow the crew to pull the manual speed into the speed schedule when the crew deems it time to do so.

Referring to FIGS. 2A-2B, a flight management system interface useful for implementing an exemplary embodiment are shown. In one example, an initial speed schedule (as in FIG. 2A) defines speeds and altitudes for various phases of a flight and a cruise phase speed 200 of 300 knots or 0.85 mach. The speed schedule is basis for certain predictions 202. At some point, air traffic control may instruct the crew to fly at 270 knots instead of 300 knots for traffic reasons. In at least one embodiment, the crew may switch to a manual mode 204 and begin flying at 270 knots. The FMS may retain the existing speed schedule in a memory and switch current speed 208 to 270 knots. Speeds for the current flight phase 206 are updated to reflect the current speed 208, and new predictions 210 are generated.

At some future time, air traffic control may instruct the crew to return to the original flight plan, and the crew may switch from the manual mode to an automatic mode. The original speed schedule is resumed and the FMS produces speed schedule-based predictions.

Alternatively, the crew may elect to retain the manual speed as an updated entry in the speed schedule for the duration of the flight/phase. In the present example, the FMS would the current speed 208 at 270 knots and produce predictions on the route page. Performance predictions continue to predict the future state of the aircraft based on the current set of inputs, with the prior manual speed as the FMS planned speed while in the automatic mode.

Figure 3:
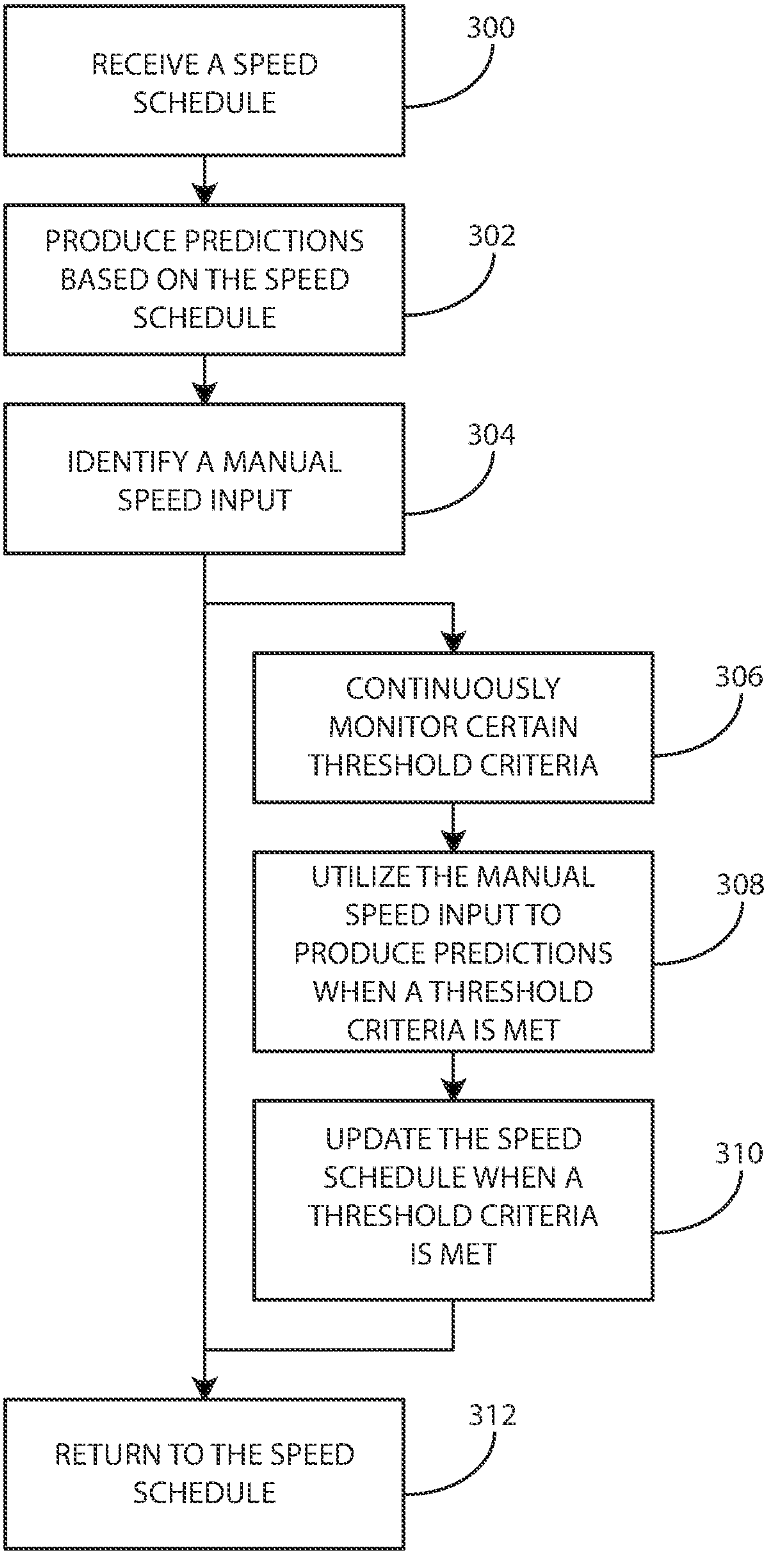
FIG. 3 shows a flowchart of a method according to an exemplary embodiment.

Referring to FIG. 3, a flowchart of a method according to an exemplary embodiment is shown. A flight management system receives 300 a speed schedule and produces 302 predictions (i.e., fuel, time, and distance predictions) based on that speed schedule. The flight management system may then identify 304 that the corresponding aircraft has entered a manual speed mode. In at least one embodiment, the flight management system may receive a user input placing the aircraft in the manual mode; alternatively, the flight management system may identify a manual speed input has been entered.

After determining that the aircraft has entered the manual speed mode, the flight management system continuously monitors 306 certain threshold criteria including, but not limited to, a time in manual speed mode, a percentage of the total flight phase spend in manual mode, or an absolute deviation between the manual speed and the speed schedule.

In addition, the flight management system may compare predictions based on the manual speed input to predictions based on the speed schedule; the threshold criteria may be based on a deviation identified by the comparison.

In at least one embodiment, when one or more threshold criteria are exceeded, the flight management system may utilize 308 the manual speed input to make and display new predictions to the flight crew. In at least one embodiment, if the flight management system is maintained in the manual mode for some extended threshold time, the flight management system may update 310 the speed schedule to the manual speed input, or offer the crew the option to do so.

At any time, the flight management system may be returned 312 to an automatic mode and generate predictions based on the speed schedule.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:

at least one processor in data communication with a memory storing processor executable code for configuring the at least one processor to:

receive a speed schedule;

identify a manual speed input;

continuously monitor one or more threshold criteria, wherein the one or more threshold criteria comprises at least one of:

a threshold deviation between prediction based on the speed schedule and the manual speed input;

a threshold time in the manual mode; or a weighted function based on a time in the manual mode and an absolute deviation between the speed schedule and manual speed;

when the one of the one or more threshold criteria are met, provide the manual speed input to one or more predictive functions; and update the speed schedule based on the manual speed input meeting one of the one or more threshold criteria in the manual mode; and switch from the manual mode to the automatic mode based on the updated speed schedule.

2. The computer apparatus of claim 1, wherein the at least one processor is further configured to:

record predictions based on the speed schedule;

record predictions based on the manual speed input; and compare the predictions based on the speed schedule to the predictions based on the manual speed;

wherein the at least one of the threshold criteria is the threshold deviation between the predictions based on the speed schedule and the manual speed input.

3. The computer apparatus of claim 1, wherein:

the at least one processor is further configured to record a time beginning with receiving the manual speed input;

wherein the at least one of the threshold criteria is the threshold time in the manual mode.

4. The computer apparatus of claim 3, wherein the at least one of the threshold criteria is the weighted function based on the time in the manual mode and the absolute deviation between the speed schedule and manual speed such that a greater speed deviation over a short period of time triggers the same threshold criteria as a small speed deviation over a longer period.

5. The computer apparatus of claim 3, wherein the processor is further configured to amend the speed schedule to conform to the manual speed after a predefined time in the manual mode.

6. A method comprising:

receiving a speed schedule;

identifying a manual speed input;

continuously monitoring one or more threshold criteria, wherein the one or more threshold criteria comprises at least one of:

a threshold deviation between prediction based on the speed schedule and the manual speed input;

a threshold time in the manual mode; or a weighted function based on a time in the manual mode and an absolute deviation between the speed schedule and manual speed;

when the one of the one or more threshold criteria are met, providing the manual speed input to one or more predictive functions; and rendering predictions updating the speed schedule based on the manual speed input meeting one of the one or more threshold criteria in the manual mode; and switching from the manual mode to the automatic mode based on the updated speed schedule.

7. The method of claim 6, further comprising:

recording predictions based on the speed schedule;

recording predictions based on the manual speed input; and comparing the predictions based on the speed schedule to the predictions based on the manual speed, wherein the at least one of the threshold criteria is the threshold deviation between the predictions based on the speed schedule and the manual speed input.

8. The method of claim 6, further comprising recording a time beginning with receiving the manual speed input, wherein the at least one of the threshold criteria is the threshold time in the manual mode.

9. The method of claim 8, wherein the at least one of the threshold criteria is the weighted function based on the time in the manual mode and the absolute deviation between the speed schedule and manual speed such that a greater speed deviation over a short period of time triggers the same threshold criteria as a small speed deviation over a longer period.

10. A flight management system comprising:

at least one processor in data communication with a memory storing processor executable code for configuring the at least one processor to:

receive a speed schedule;

identify a manual speed input;

continuously monitor one or more threshold criteria, wherein the one or more threshold criteria comprises at least one of:

a threshold deviation between prediction based on the speed schedule and the manual speed input;

a threshold time in the manual mode; or a weighted function based on a time in the manual mode and an absolute deviation between the speed schedule and manual speed;

when the one of the one or more threshold criteria are met, provide the manual speed input to one or more predictive functions; and update the speed schedule based on the manual speed input meeting one of the one or more threshold criteria in the manual mode; and switch from the manual mode to the automatic mode based on the updated speed schedule.

11. The flight management system of claim 10, wherein the at least one processor is further configured to:

record predictions based on the speed schedule;

record predictions based on the manual speed input; and compare the predictions based on the speed schedule to the predictions based on the manual speed;

wherein the at least one of the threshold criteria is the threshold deviation between the predictions based on the speed schedule and the manual speed input.

12. The flight management system of claim 10, wherein:

the at least one processor is further configured to record a time beginning with receiving the manual speed input;

wherein the at least one of the threshold criteria is the threshold time in the manual mode.

13. The flight management system of claim 12, wherein the at least one of the threshold criteria is the weighted function based on the time in the manual mode and the absolute deviation between the speed schedule and manual speed such that a greater speed deviation over a short period of time triggers the same threshold criteria as a small speed deviation over a longer period.

14. The flight management system of claim 12, wherein the processor is further configured to amend the speed schedule to conform to the manual speed after a predefined time in the manual mode.

* * * * *